June 30, 1970  KIYOSHI KITAI  3,517,594

CAMERA WITH TWO DIFFERENT AUTOMATIC PHOTOGRAPHIC MECHANISMS

Filed Aug. 23, 1967

United States Patent Office 3,517,594
Patented June 30, 1970

3,517,594
CAMERA WITH TWO DIFFERENT AUTOMATIC PHOTOGRAPHIC MECHANISMS
Kiyoshi Kitai, Tokyo, Japan, assignor to Kabushiki Kaisha Hattori Tokeiten
Filed Aug. 23, 1967, Ser. No. 662,691
Claims priority, application Japan, Aug. 24, 1966, 41/55,373
Int. Cl. G01j 1/00
U.S. Cl. 95—10                    9 Claims

ABSTRACT OF THE DISCLOSURE

A photographic camera has a light or exposure meter and two different automatic photographic or exposure control mechanisms to which the light meter is common. The light meter senses the light in the field to be photographed and applies adjustments for control of the iris diaphragm of the camera for automatically correctly setting the different exposure aperture settings or sizes taking into consideration the ambient illumination sensed by the light meter. The two mechanisms or systems cooperate with the common light meter in setting aperture sizes as a function of the light sensed by the light meter. When a first one of the mechanisms is used a photographic exposure is controlled according to programmed exposure time and aperture on a manually preset film sensitivity setting and an indication of the light or exposure meter. When a second one of the automatic mechanisms or systems is used the aperture is adjusted according to a preselected exposure time on a manually preset film sensitivity setting and an indication of the exposure or light meter. A completely manual exposure control system or mechanism is provided with which the camera operator can render the light meter ineffective and can select the exposure time and aperture settings without regard to the light or exposure meter. The three systems have many common components thereby simplifying the mechanisms and making them quite compact.

---

This invention relates generally to photographic cameras and more particularly to a camera having two different automatic exposure control mechanisms and a manual exposure control system.

Cameras are known having different exposure or photographic control mechanisms which are either automatic or manual. Moreover, where a plurality of mechanisms are used in cameras for controlling exposures generally the mechanisms have most parts that are not common and are therefore relatively complex and occupy a considerable amount of space.

It is a principal object of the present invention to provide in a camera new and improved simplified automatic photographic control mechanisms or systems having many common elements and devices including a common light or exposure meter.

Still another object of the invention is to provide a simple and improved mechanism for setting the iris diaphragm apertures of a photographic camera by automatic operation and independent manual operation and various combinations of control inputs.

According to the invention a photographic camera is provided with iris diaphragm means operable selectively to effect an exposure aperture of the same and different sizes for effecting photographic exposures. Control means including a movable member operable electrically to different positions representative of different value settings or different sizes of the aperture are provided in the camera. The control means is connected to automatic means having a circuit means including light-responsive or light-sensing means, for example, a photoelectric cell or device, for selectively and automatically positioning the movable member to positions thereof representative of the openings or settings of the diaphragm aperture to be used in accordance with sensings of light sensed by the light sensing device in a field in which is disposed a subject to be photographed. The movable member is a pointer of a light meter which can be rendered ineffective for taking photographs on aperture settings and exposure time set manually.

The automatic control mechanisms or systems of the invention are independent of the manual control mechanism or system and each cooperate with manually set means for effecting photographic exposures with respective manually preset film sensitivity settings being taken into consideration.

A first one of the mechanisms cooperates with the iris diaphragm means for automatically programmed exposure time settings applied to a diaphragm ring or element and carries out exposure aperture settings compensated automatically for light meter readings taking into consideration the manually preset film sensitivity settings. The second control mechanism carries out automatically controlled exposure apertures automatically adjusted for the light sensed by the light meter and with the timing thereof manually preselected and taking into consideration the manually preset film sensitivity settings.

The light meter in the camera, common to both control mechanisms, has the sensitivity thereof varied by placing a resistor in circuit when a first automatic control system is in use and taking it out of circuit when the second control system is in use. The light meter has its movable pointer or indicator compensated for the different sensitivity settings of the light meter by compensation of the pointer's basic or reference position of the meter when the different automatic control mechanisms are in use.

Other features and advantages of the control mechanisms for variably setting iris diaphragm exposure settings, in accordance with the present invention, will be better understood as described in the following specification and appended claims, in conjunction with the following drawings in which:

Figure 1:
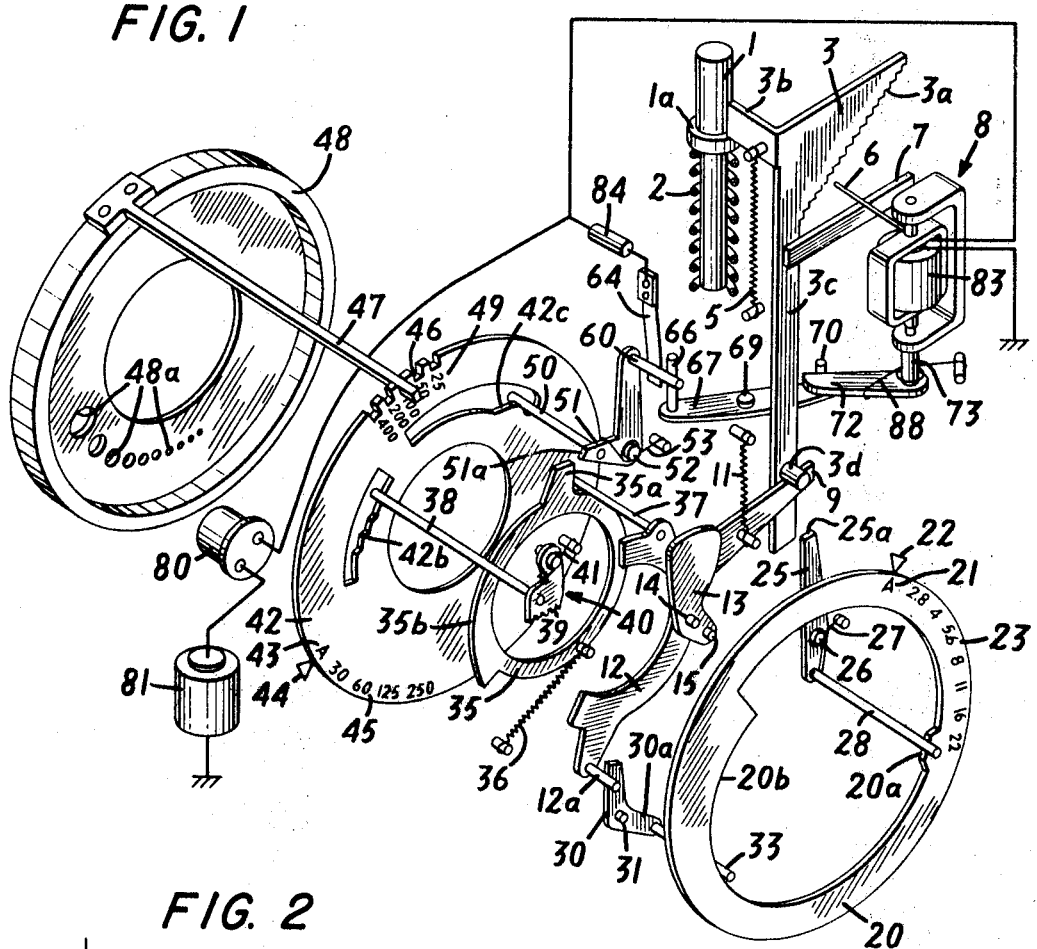
FIG. 1 is a diagrammatical exploded view of an embodiment of camera automatic control mechanisms according to the invention.

According to the drawing a camera provided with the invention is fragmentarily shown. The camera case is not shown and only the pertinent components of the camera and mechanism of the invention are illustrated diagrammatically in relative positions. As shown in FIG. 1 a release button 1 is biased by a spring 2 to a rest position illustrated in the drawing. As part of two automatic control mechanisms an aperture-setting element is provided comprising a control plate 3 provided with a diagonally stepped edge 3a and having an arm 3b engaging a collar 1a on the release button 1. The control plate 3 is biased downwardly by a spring 5 in opposition to the spring 2 which is a stronger spring and releasably retains the control plate 3 in a raised position illustrated in the drawing.

The control plate 3 travels downwardly when the release button 1 is depressed so that its stepped edge 3 engages a movable member limiting its downward movement in accordance with the desired settings or sizes of the aperture sizes or openings in dependence upon ambient light being sensed in the field of exposure. In the invention this movable member comprises a pointer 6 supported on a fixed surface 7 of a light exposure meter 8 described in detail hereinafter. The angular position of the pointer 6 is in accordance with ambient light indications of the light meter 8 and the plate 3 will move downwardly, until it engages the pointer 6, to actuate iris diaphragm blades for opening or defining the exposure aperture automatically in accordance with the light sensings of the light meter.

The control plate 3 has a downwardly extending arm 3c provided at a lower end thereof with a pin 3d engaging an arm 9 biased in an upward or counter-clockwise direction by a spring 11. The arm 9 is connected to a diaphragm ring 12, fragmentarily illustrated, for operating iris diaphragm blades. Only one blade 13 is illustrated for setting by a pin 14 on the diaphragm ring 12 and pivotally mounted on a pivot pin 15.

When the release button 1 is depressed the stepped plate 3 rotates the diaphragm ring 12 around the optical axis of the camera, with which the ring is concentric, in a clockwise direction until one of the steps on the edge 3a engages the pointer 6 in dependence upon the indication of the light meter 8. The diaphragm ring is, of course, provided with other pins, not shown, for actuating other iris diaphragm blades, not shown, for defining the exposure aperture.

A manual aperture selecting or setting ring 20 concentric with the optical axis of the camera is provided with an exposure mark 21 illustrated as A for alignment with a fixed index mark 22 when at least partially automatically adjusted exposures are to be taken. The iris diaphragm or aperture setting ring 20 is provided with a scale 23 for use with the fixed index mark 21 in manually setting aperture size settings independently of the light meter and the plate 3 as hereinafter described.

A stop or releasable locking member 25 for rendering the light meter ineffective is rotatably mounted on a pivot 26 and is biased in a counter-clockwise direction by a spring 27. The stop is provided with a pin 28 bearing on a projection or cam portion 20a of the aperture setting or adjusting ring 20 when the ring is set for automatic operation of the aperture settings or sizes under control of the light meter. When the aperture selection ring 20 is set for manual exposure and the scale 23 is being used the ring 20 is rotated such that the pin 28 does not bear on the cam 20a so that the lock 25 is rotated by the spring 27 in a direction so that it lies in the downward path of travel of the control plate 3. The releasable lock is provided with a tip 25a which will project within the path of the control plate 3 and bear on the lower end thereof so that the control plate 3 and the light meter are releasably rendered ineffective.

The aperture selection ring 20 is coupled to the diaphragm ring 12 by a coupling lever 30 pivotal on a pivot 31 and having an arm 30a bearing on a pin 12a fixed on the diaphragm ring 12. The coupling lever is provided with a transmission pin 33 bearing against a cam 20b of the aperture adjusting ring 20 so that the aperture sizes can be manually adjusted or set by rotating the aperture adjusting ring to the desired position on the scale 23 and thereby applying a setting to the diaphragm ring 12.

A speed-regulating ring 35, mounted coaxial with the optical axis of the camera, is provided for use when a first one of the control mechanisms is in use. The exposure speed-adjusting ring 35 is biased in a clockwise direction by a spring 36. The diaphragm operating ring 12 is coupled to the exposure speed-adjusting ring by a pin 37 engaging with a peripheral projection or profile abutment 35a provided on the exposure speed-adjusting ring 35. The iris diaphragm operating ring 12 is biased in a counter-clockwise direction with greater force than the clockwise rotational force applied to the exposure speed- adjusting or speed-control ring 35. The exposure speed-adjusting ring 35 is provided with a profile cam 35b automatically controlling or programming exposure time in cooperation with a pin 38 provided on a segment gear 39 of a delay mechanism 40 for regulating exposure time and tending to rotate in a counter-clockwise direction in response to the biasing force of a spring 41.

The invention provides an exposure time-adjusting ring coaxial with the other rings about the optical axis of the camera adjustable angularly as later described. The time-adjusting ring is provided with an exposure mark 43, illustrated as A, positioned in registry with a fixed index mark 44 when automatic time adjustment is to be made. The time-adjusting ring 42 is illustrated in the drawing in position for automatic time adjustment. The ring, however, is provided with a time scale 45 for manually setting or adjusting the exposure time at which the individual photographic exposures are to be taken. The time-adjusting ring is provided with a plurality of peripheral recesses 46 in which is received a resilient arm 47 fixed to a film sensitivity-adjust ring 48 for adjusting or setting the camera to take into consideration film sensitivity on a film sensitivity scale 49 having indicia on the time-adjusting ring 42 corresponding to each recess 46 as illustrated.

The time-adjusting ring 42 is provided with an internal cam 42b cooperating with the pin 38 of the segment gear 39 and adjusts it and thereby exposure time when the time is selected manually. The cam 42b is positioned so that it is ineffective in the automatic position illustrated. When the time-adjusting ring 42 is rotated to the scale 45 it provides manual exposure time adjust of the segment gear. Another internal cam 42c cooperates with a pin 50 connected to an arm of a speed-adjusting ring locking lever 51 biased in a counter-clockwise direction about a pivot 52 by a spring 53.

The speed-adjusting ring locking lever 50 cooperating with the internal cam 42c is releasably held in the position illustrated clear of the path of rotation of the projection 35a of the speed-adjusting ring 35. When the exposure time is controlled manually the time-adjusting ring 42 is rotated into a position in which indicia of the time scale 45 is aligned with the index 44 and the locking lever 50 is therefore released by the time-adjusting ring internal cam 42c so that the stop or lock 51 is rotated by the spring 53 into the path of rotation of the speed-adjusting ring projection 35a thereby releasably locking the speed-adjusting ring 35 so that the manual exposure time settings are independent of the speed regulating ring 35 and can be made independently of one or both of the automatic control mechanisms of the invention.

The releasable stop 51 has another arm on which is fixed a pin 60 engaging a plate contact 64 for changing the sensitivity of the exposure meter 8. The time-adjusting ring 42 is in a position illustrated for effecting automatic time exposure at which time the sensitivity of the exposure meter is in a reduced condition for reasons later explained. The release lock pin 60 also abuts a pin 66 fixed in an upstanding position on an intermediate lever 67 pivotally mounted on a pivot 69 and having another upstanding pin 70 close adjacent an opposite end for rotating a lever 72 fixed to the exposure meter and movable about an axis 73 for compensating or correcting the exposure meter depending upon which automatic control mechanism is in use.

The light meter 8 is provided with a photoconductive cell or unit 80 connected in circuit to a source of power or battery 81 and an operating coil 83 of a galvanometer portion of the light meter for driving the pointer 6 in proportion to current developed as a function of the light sensed by the cell 80 ambient in the field of the exposure. The cell 80 "views" or "sees" the field of the photographic exposure through openings 48a of different cross sectional areas in the film sensitivity adjust ring 48. The individual openings are positioned in axial alignment with the cell 80 as the film sensitivity settings are made with the film sensitivity adjust ring 48. The current developed by the cell, therefore, is in response to brilliance in the field being photographed taking into consideration film sensitivity.

The circuitry of the light meter is provided with a resistor 84 in circuit with the light meter operating coil and the cell when the plate contact 64 engages the pin 60 on the speed-adjusting ring lock lever 51. When the pin 60 and the contact 64 are spaced from each other the resistor 84 is out of circuit and the light-sensing device or light meter becomes more sensitive and requires the compensation referred to above and carried out for reasons later set forth.

The operation of the first automatic exposure control mechanism in FIG. 1, wherein the exposure is automatically controlled in accordance with a programmed exposure time and aperture, is as follows: As the release button 1 is pressed downwardly the stepped plate 3 moves down until one of the steps 3a on the edge of the stepped plate 3 abuts the pointer 6 of the exposure meter 8. The diaphragm ring 12 rotates in a clockwise direction an angle corresponding to the axial displacement of the lower arm 3c of the stepped plate 3 and operates the shutter blades thereby to form a desired aperture. The speed regulating ring 35 turns in a clockwise direction following after the coupling pin 37 of the diaphragm ring 12 biased by the force of the spring 36 and its profile cam 35b controls the position of a segment gear 39 of a gear delay mechanism 40, fragmentarily shown, for adjusting the desired exposure time. As the release button 1 moves downwardly further, well-known shutter mechanism, not shown, starts to operate and the exposure operation is accomplished. Thus, in this embodiment automatic exposure control from a maximum exposure value of EV 8 (1/30 sec. F 2.8) to a minimum exposure value of EV 17 (1/25 sec. F 22) may be accomplished.

The second automatic exposure control system operates as follows: Firstly the exposure time-adjusting or time-selecting ring 42 is angularly set so the exposure time scale indicates with the fixed index mark 44 the exposure time desired. If the time-selecting ring 42 is an angular position other than that set for automatic exposure, the speed-regulating ring locking lever 51 turns, through the action of the biasing spring 53, in a counter-clockwise direction. One end 51a of the locking lever 51 associates with the peripheral projection 35a of the speed regulating ring 35 and keeps it from rotating thereby rendering ineffective its programmed exposure time. The pin 60 on the other end of the lock or stop lever 51 moves away from the plate contact 64 so that a branch circuit including the contact plate and the resistor 84 is cut off or out of circuit and thereby the sensitivity of the exposure meter increases greatly. The intermediate lever 67 is revolved by a spring 88 biasing the lever 82 and the exposure meter moves in a clockwise direction correcting its own pointer's reference or "rest" position. It is to be noted that the change in the sensitivity of the exposure meter and the correction of its basic or rest position are most important.

Figure 2:
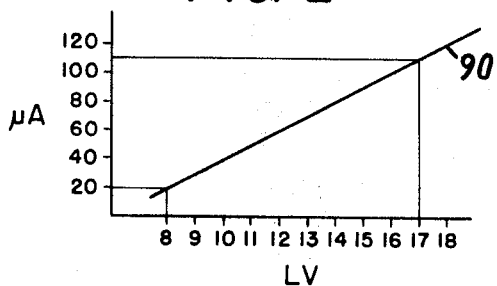
FIG. 2 is a diagram of the characteristics of a light sensor or photoelectric cell used with the invention.
Figure 3:
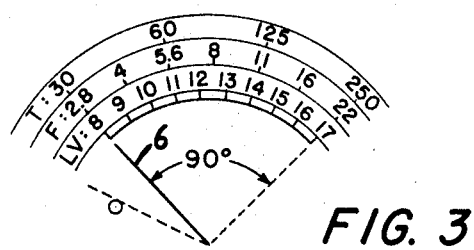
FIG. 3 is a diagram illustrating angles of swing of the pointer of an exposure meter when used with the two automatic control systems.

Referring to the embodiment illustrated, the photoelectric cell 80 has luminous and electric current characteristics as shown, in FIG. 2, by a straight line 90 and the exposure meter has a characteristic of an angle of swing as shown in FIG. 3. Accordingly, to the first automatic exposure control system, 10° would be the best angle of swing for the pointer in proportion to a change equal to 1 EV of the ambient illumination.

In the second automatic exposure control system, the angle of swing for the pointer 6 in proportion to a change equal to 1 EV of the aperture should be 15°. In all cases, however, the increase of the electric current in the meter under control of the photoelectric cell is constant or linear relative to a change corresponding to 1 EV of the ambient illumination. This is a first reason why the sensitivity of the exposure meter must be changed. The need for correction or compensation of the exposure meter is due to the fact that the position of the pointer 6 relative to the same value of electric current varies with the change of the sensitivity of the exposure meter.

An adjustment in the connection 47 of the film sensitivity adjust ring 48 and the exposure-time selecting ring 42 is common for the two automatic exposure control systems. When the exposure time selecting or adjusting ring is shifted from the position of the first automatic system to that of the second automatic systems, since a space interval of the time scale 45 of the exposure time selecting or adjusting ring 42 and that of between the automatic exposure mark 43 and the position of 1/30 sec. of the time scale are equal, the luminous flux coming in the photoelectric cell would diminish in quantity equal to 1 EV. Consequently, the position of the pointer of the exposure meter relative to the ambient illumination will vary to an extent equal to 1 EV. This is a second reason why the position of the exposure meter is corrected.

Figure 4:
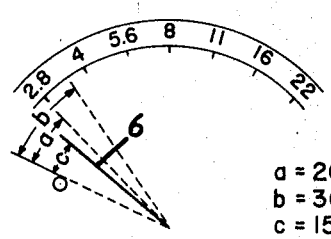
FIG. 4 is a diagram illustrating angles of swing of the pointer of the exposure meter of the camera when used with control mechanism in accordance with the invention.

FIG. 4 shows these relationships in reference to the embodiment illustrated. Further, in the embodiment illustrated the position of 20°, shown by an angle (a) from the rest position of the pointer corresponds to the position of F 2.8 in the first automatic system. In the second system, the sensitivity of the exposure meter will increase 1.5 times greater so that the position of the pointer corresponding to F 2.8 will correspond to the position of 30° as shown by the angle (b). On the other hand, as the incoming light to the photoelectric cell will diminish in quantity equal to 1 EV, the final position of the pointer corresponding to F 2.8 will correspond to an angle of 15° as shown by the angle (c). Since there is a difference of 5° between the angles (a) and (c), it is required to revolve the exposure meter for correction of this difference. It is to be added that such correction may not be effected by the revolution of the exposure meter in other cases, i.e., such will be the case when the angle (b–a) in FIG. 4 agrees with the decrease of the angle of swing of the pointer in proportion to the decrease of the luminous flux coming in the photoelectric cell. In another embodiment, the angle (a) may be 30°, so that the angle (b) will be 45°, and the difference between the angles (a) and (b) is 15°. As the luminous flux coming in the photoelectric cell will diminish in quantity equal to 1 EV, the angle of swing of the pointer will diminish an angle of 15° equal to 1 EV of the aperture and therefore the angle (a) will become equal to the angle (c).

As described hereinabove, in the second automatic exposure control system, since the position of the exposure meter may be corrected and the speed adjusting ring 35 is locked, the stepped plate 3 will be depressed upon pressing of the release button 1 downwardly. Accordingly, the diaphragm ring 12 will turn in a clockwise direction and adjusts an adequate aperture. Thereafter by continuing pressing the release button 1 downwardly the shutter will operate in response to the selected exposure time.

In case completely manual exposure settings are made the aperture-adjusting or aperture-selecting ring 20 is turned until the fixed mark 22 is in alignment with the desired diaphragm scale 23 setting and the diaphragm ring 12 is operated by the cam part 20b through the lever 30 in order to form the selected aperture. When, on the other hand, the aperture-selecting ring 20 is at a position other than that of automatic exposure, the locking lever 25 stops the stepped plate 3 from being operated. Therefore, manual exposures may be effected irrespective of the indication of the exposure meter as the stepped plate will not come downwardly even if the release button 1 is pressed downwardly.

It can be seen that the present invention provides three control mechanisms for controlling photographic exposures. A single control plate 3 is used in common for the two automatic exposure control mechanisms or systems for automatically carrying out some of the inputs. The invention provides a wider range of operation as to the extent of brightness or illumination inputs taken into consideration. The various operations are carried out simply and easily set by simplified mechanisms having many common parts. A third system provides for manually carrying out aperture selection and exposure time settings independent of the automatic inputs. Thus manual inputs and automatic inputs and combinations thereof can be carried out by partially common mechanisms and can be made independently of each other.

While a preferred embodiment of the invention has been shown and described, it will be understood that many modifications and changes can be made within the true spirit and scope of the invention.

What I claim and desire to be secured by Letters Patent is:

1. In a camera having diaphragm means operable selectively to define an exposure aperture of the same and different sizes for effecting photographic exposures, in combination, two automatic exposure control mechanisms for effecting photographic exposures, a light-sensing device common to both of said control mechanisms for controlling different sizes of said exposure aperture in accordance with different values of ambient light sensed by said light-sensing device in a field in which a subject is photographed, a first one of said control mechanisms including means cooperative with said diaphragm means for effecting photographic exposures with previously programmed exposure time and aperture under control of said light-responsive device automatically in accordance with light sensings thereof, and a second one of said control mechanisms including means for effecting photographic exposures with said exposure aperture adjusted according to preselected respective exposure times and automatically in accordance with light sensings of said light-sensing device said light-sensing means comprising means for rendering said light-sensing means less sensitive electrically to ambient illumination when in use in conjunction with said first one of said exposure control mechanisms.

2. In a camera according to claim 1, including means cooperative with said exposure control mechanisms for effecting said photographic exposures with a respective preset film sensitivity setting.

3. In a camera according to claim 1, including mechanism for manually selecting and setting a preselected exposure time independently of said light-sensing device and including elements common to said two exposure control mechanisms.

4. In a camera according to claim 3, including mechanism for manually setting selected aperture size settings manually independently of said light-sensing device and including elements common to said two exposure control mechanisms.

5. In a camera according to claim 1, in which said exposure control mechanisms comprise a time programming device common to both control mechanisms automatically programming exposure time in said first one of said exposure control mechanism, means for manually setting exposure time independently of said time programming device in said second one of said exposure control mechanisms and rendering said programming device ineffective in said second one of said exposure control mechanisms.

6. In a camera having diaphragm means operable selectively to define an exposure aperture of the same and different sizes for effecting photographic exposures, in combination, light-responsive means having a movable member automatically operable to different deflected positions relative to a given reference position and representative of different values of light brightness sensed by said light-responsive means in a field in which a subject is photographed using said camera and representative of different value settings applied to said diaphragm means for setting therein different sizes of said exposure aperture, means cooperative with said movable member and operably connected to said diaphragm means to variably set the value of said exposure aperture in dependence upon the deflected position of said movable member, two different automatic exposure control mechanisms each including common means cooperating with said light-responsive means and each including said means cooperative with said movable member for effecting photographic exposures, a first one of said exposure control mechanisms including means cooperative with said diaphragm means for effecting photographic exposures with automatically programmed exposure times and exposure aperture settings under control of said light-responsive means, and a second one of said exposure control mechanisms including means cooperative with said diaphragm means for effecting photographic exposures with said exposure aperture settings adjusted according to preselected respective exposure times and said exposure aperture settings applied in accordance with sensings of said light-sensing means and under control thereof, and means to compensate the sensitivity of said light-responsive means differently for each of said two exposure control mechanisms.

7. In a camera according to claim 6, including manually operated exposure control mechanism having parts in common with both of said automatic exposure control mechanisms manually determining exposure aperture size settings and exposure time.

8. In a camera according to claim 6, in which said light-responsive means comprises an ambient light meter having said movable member movable proportionately to light sensed by said light meter, and said means cooperative with said movable member comprising a control plate movable an extent determined by the position of said movable member.

9. In a camera according to claim 6, in which said light-responsive means comprises a photoelectric light meter.

References Cited

UNITED STATES PATENTS

| | | | |
|---|---|---|---|
| 3,182,575 | 5/1965 | Jakob et al. | 95—10 |
| 3,213,771 | 10/1965 | Starp | 95—10 |
| 3,213,772 | 10/1965 | Starp | 95—10 |
| 3,213,773 | 10/1965 | Starp | 95—10 |
| 3,421,812 | 1/1969 | Kubota | 95—10 XR |

NORTON ANSHER, Primary Examiner

D. S. STALLARD, Assistant Examiner

U.S. Cl. X.R.

95—64